(No Model.)

A. O. BARNES.
ANTI FRICTION BEARING.

No. 263,097. Patented Aug. 22, 1882.

WITNESSES:

INVENTOR:
A. O. Barnes
BY
ATTORNEYS.

UNITED STATES PATENT OFFICE.

ARTHUR O. BARNES, OF MOORE PARK, MICHIGAN.

ANTI-FRICTION BEARING.

SPECIFICATION forming part of Letters Patent No. 263,097, dated August 22, 1882.

Application filed May 11, 1882. (No model.)

*To all whom it may concern:*

Be it known that I, ARTHUR O. BARNES, of Moore Park, in the county of St. Joseph and State of Michigan, have invented certain new and useful Improvements in Anti-Friction Bearings, of which the following is a full, clear, and exact description.

Reference is to be had to the accompanying drawings, forming part of this specification, in which similar letters of reference indicate corresponding parts in all the figures.

Figure 1:
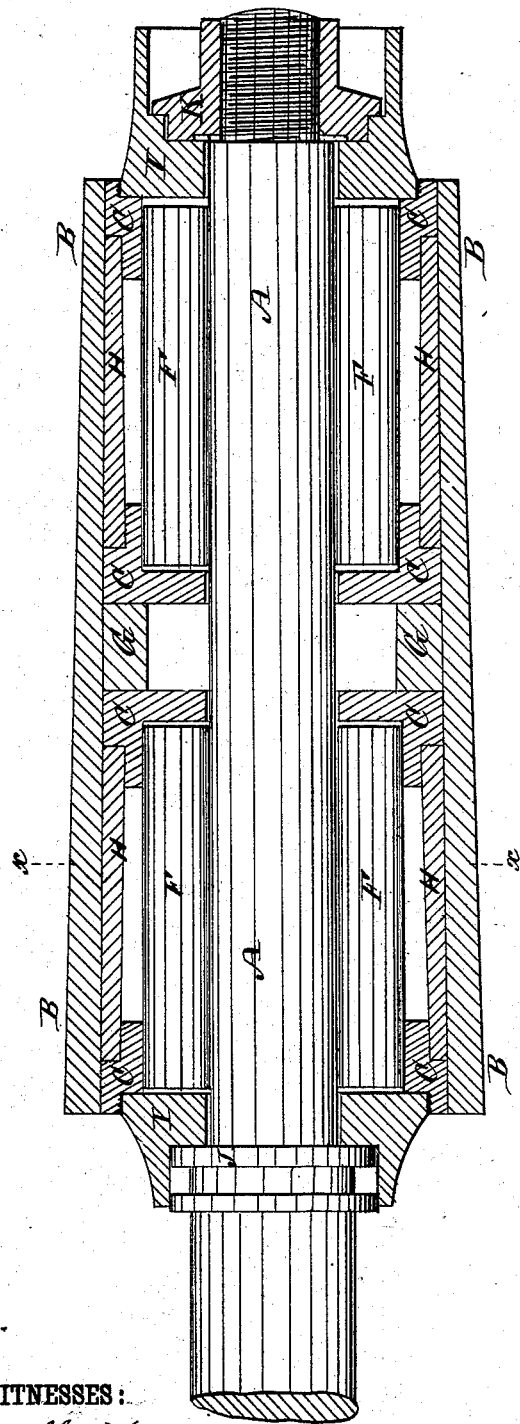
Figure 3:
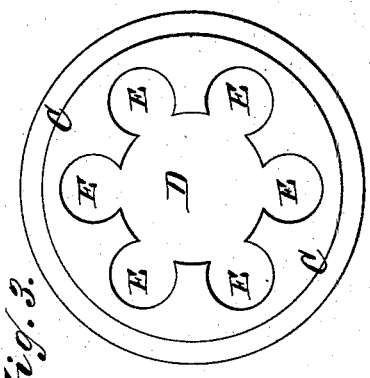
Figure 2:
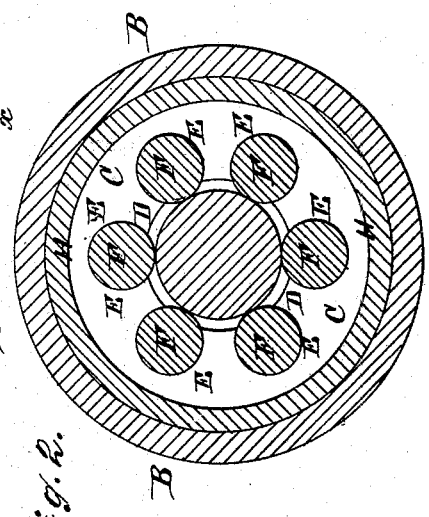

Figure 1 is a sectional side elevation of my improvement. Fig. 2 is a sectional end elevation of the same, taken through the line $x\,x$, Fig. 1. Fig. 3 is a plan view of an outer head, the rollers being removed.

The object of this invention is to lessen the friction in the journal-bearings of axles and shafts and insure the continuous oiling of the said journals.

The invention consists in an anti-friction bearing constructed with a box or thimble having heads fitted into it, which heads are provided with openings to receive the journal and a set of friction-rollers. To the heads is attached a shell to inclose the rollers and form an oil-chamber. The bearing is kept in place upon the axle by cap-collars screwed into the countersunk sides of the heads and the axle-nut screwed upon the end of the axle, as will be hereinafter fully described.

I will describe my improvement as applied to an axle-bearing, but do not limit myself to that application, as it can be used with equal advantage upon the journals of shafts and in other bearings.

A represents an axle, and B represents a thimble-skein or hub.

C are heads, which are placed in the thimble B and are made with a central opening, D, to receive the axle A, and with six (more or less) openings, E, around the said central opening, D, to receive the rollers F. The central opening, D, is made larger than the axle A, and the openings E are so formed that the inner sides of the rollers F will project beyond the surface of the said opening, and thus rest upon the said axle A. The openings E of the inner heads C are made in the form of sockets, as shown in Fig. 1, to prevent the rollers F from passing in too far. The inner heads C are kept apart, when desired, by a ring, G, interposed between them, as shown in Fig. 1. The inner parts of the outer sides of the heads C are countersunk to receive the ends of a band or shell, H, by which they are connected. The outer sides of the outer heads C are countersunk, and in the shoulders thus formed are cut screw-threads, into which are screwed cap-collars I, which rest against the outer ends of the rollers F and keep the said rollers in place. The inner cap I is countersunk upon the outer side to receive the collar or shoulder J of the axle A. The outer cap I is countersunk upon the outer side to receive the axle-nut K.

Two sets of rollers F can be used, and in the case of axles this construction is preferred; but in the case of shaft-journals one set will generally be sufficient.

In the case of shaft-bearings the heads C can be both made with the openings E in the form of sockets and can be slipped upon the shaft from one end. Or the said heads can be made in two parts or halves and the two parts secured together by bolts after being placed upon the shaft. In this case the shell H will not be required. Or the heads and shell can be made in two parts or halves, each part or half being cast in one piece and provided with a slide to cover the ends of the rollers and keep them in place, the two parts being bolted together after being placed upon the shaft. This construction is especially adapted for shaft and car-axle bearings. With this construction the space between the heads C and the rollers F serves as an oil-chamber, and the oil will be continuously applied to the journal A by the said rollers F as the shaft or wheel revolves.

The heads C can be made with projections or ribs, which are not shown in the drawings, to keep them from turning in their seats.

Having thus fully described my invention, I claim as new and desire to secure by Letters Patent—

1. An anti-friction bearing constructed substantially as herein shown and described, and consisting of the thimble B, the heads C, having openings D and E, the ring G, the rollers F, the shells H, and the cap-collars I, as set forth.

2. In an anti-friction bearing, the combination, with the journal A and the thimble or box B, of the heads C, having openings D and E, the shell H, the rollers F, and means, as set forth, for securing the heads in the thimbles, substantially as herein shown and described, whereby the friction between the journal and bearing is greatly lessened, as set forth.

3. In an anti-friction bearing, the combination, with the journal A, the thimble or box B, the heads C, and the rollers F, of the shell H, substantially as herein shown and described, to adapt the bearing to serve as an oil-chamber, as set forth.

4. In an anti-friction bearing, the combination, with the axle A, provided with the collar J, the thimble or box B, the heads C, the rollers F, and the axle-nut K, of the screw-collars I, substantially as herein shown and described, whereby the rollers are kept in place in the heads and the bearing is kept in place upon the axle, as set forth.

ARTHUR OLIVER BARNES.

Witnesses:
ALBERT C. TITUS,
EDWARD B. LINSLEY.